United States Patent Office 2,696,113
Patented Dec. 7, 1954

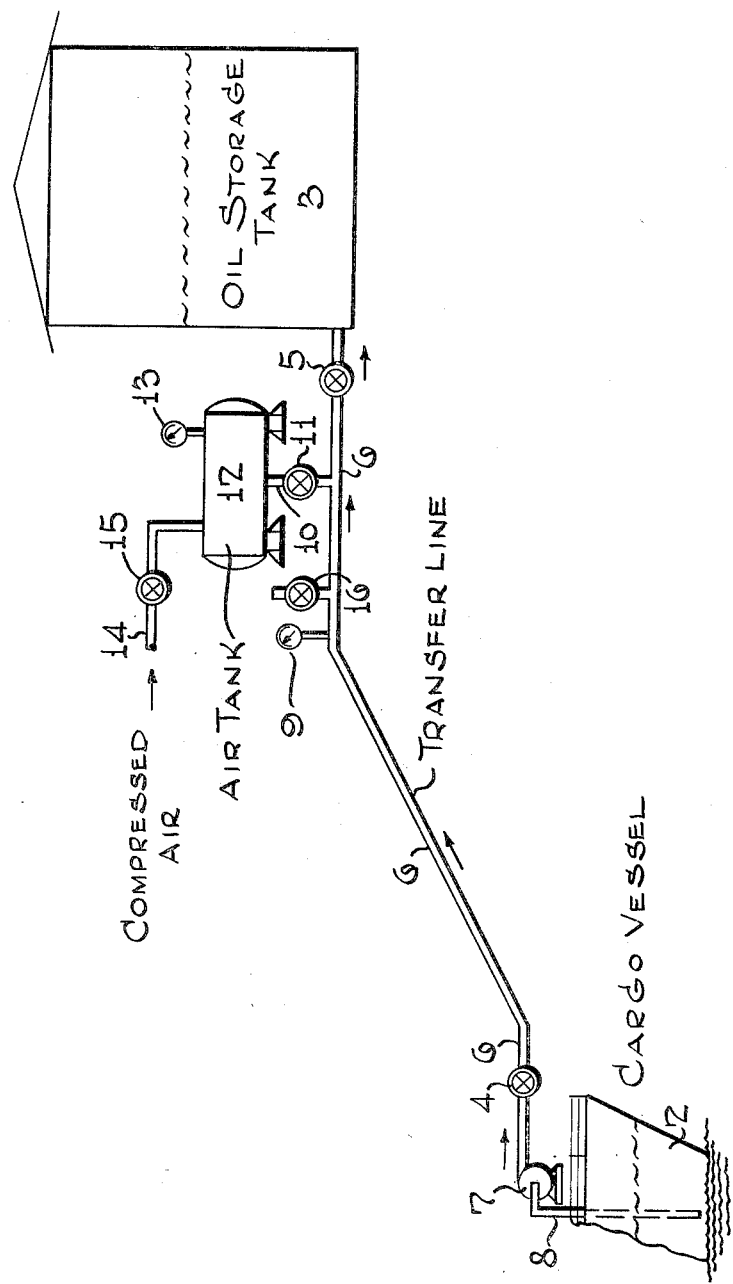

2,696,113

METHOD OF DETERMINING THE VOLUME OF LIQUID TRANSFERRED FROM A SOURCE TO A RECEPTACLE THROUGH AN INTERCONNECTED CONDUIT

James H. Prescott, Westfield, N. J., and Emmet V. Dunathan, North Bellmore, N. Y., assignors to Standard Oil Development Company, a corporation of Delaware Application July 16, 1952, Serial No. 299,285

2 Claims. (Cl. 73—194)

The present invention concerns an improved method for determining the amount of liquid that has passed through a conduit or transfer line. It further concerns a method for determining the volume of void or gas space in a conduit or line that is used for transferring liquids. More specifically, it relates to a method for introducing a known volume of a gas into the void or gas spaces existing within a liquid transfer line whereby the volume of the void or gas spaces can be determined from the pressure increase resulting in the line. It is preferred that gases, which are employed for this purpose, be substantially non-soluble in the liquid and adhere reasonably well to the ideal gas laws at ambient temperatures.

In the petroleum industry, oil transfer lines that are not completely filled with oil and therefore contain void spaces are generally referred to as "slack lines." Slack lines constitute a particular problem at refineries, terminals and bulk plants where they are frequently responsible for substantial discrepancies in measuring the amounts of oil transferred between storage tanks, barges, tankers, tank cars and the like.

Slack lines are generally caused by air becoming mixed with oil during an oil transfer operation. For example, in transferring oil from a cargo vessel to a shore tank, air is often introduced into the shore transfer line during stripping of the cargo vessel's tanks. It may also be drawn into the transfer system by leakage through the packing gland of the transfer pump. As a result, very serious discrepancies often occur in determining the volume of oil that has been transferred from the vessel into the shore tank.

The exact manner in which slack lines cause measurement errors is best explained by considering the procedure involved in transferring and measuring oil from a source such as a cargo vessel to a shore oil storage tank. A transfer pump withdraws the oil from the cargo vessel and forces it through a pipe or large hose to the shore tank. The amount of oil so transferred is conventionally determined by gauging the shore tank and the vessel's tanks before and after the transfer. It is apparent, however, that if the transfer line contained a considerable volume of air before the transfer and contains little or no air after the transfer, the volume of oil removed from the vessel will be greater than the volume actually supplied to the shore tank. Likewise, if the transfer line contained very little or no air before the transfer and a considerable volume of air afterward, the volume of oil removed from the vessel will be smaller than the volume that actually entered the shore tank.

Depending upon the size and length of the transfer line, errors in the amount of 10,000 gallons or more can easily occur. Some transfer lines have capacities of more than 30,000 gallons and therefore even small changes percentagewise in the amount of air contained in such lines can represent very substantial changes volumewise.

Accordingly, it is an object of the present invention to provide a method for measuring the amount of liquid that passes through a transfer line whereby any measurement errors caused by changes in the volume of void space existing within the line before and after the transfer are substantially eliminated. It is also an object of the present invention to provide a method for determining the volume of void space existing in a conduit or line used for transferring liquids. It is a particular object of the present invention to provide an improved method for determining the amounts of oil that are transferred through the very large lines used in the petroleum industry at refineries, terminals and bulk plants.

It has been suggested that the errors caused by "slack lines" can be substantially eliminated by employing liquid flow meters that are equipped or used in conjunction with air eliminators in the form of tanks wherein air can be disengaged from the transferred liquid. While this procedure may be practicable for transfer operations involving small lines and small volumes of liquids, it is impracticable in the petroleum transfer operations described earlier where the lines, liquid volumes, and liquid flow rates are extremely large.

Flow rates of 500 to 7,000 gallons per minute are commonly employed when transferring oil from a cargo vessel to a shore tank. Flow meters for rates such as these are very large and extremely expensive. Furthermore, many petroleum stocks are very viscous and dirty with the result that flow meters employed on them are easily damaged and give erroneous readings. In addition, it would be virtually a necessity to provide each transfer line with its own meter and air eliminator.

The present invention not only increases the accuracy of the measurements involved in oil transfers, but it also avoids the use of expensive and relatively delicate flow meters.

For a more complete understanding of the invention, reference is now made to the accompanying drawing which is a diagrammatic illustration of an apparatus suitable for carrying the invention into effect.

Referring to the drawing, the reference character 6 designates a transfer line for conveying oil from cargo vessel 2 to storage tank 3. The transfer line may be a pipe, a hose, or any other type conduit conventionally used for this purpose. The cargo vessel may be a barge or an oil tanker provided with one or more cargo tanks. For the sake of simplicity, it will be assumed that the vessel possesses only one such tank. Similarly, it will be assumed that a substantially non-volatile and non-compressible petroleum oil is the material being transferred, although many types of liquids, such as water, alcohols, acids, etc. can be handled equally as well.

Valves 4 and 5 are positioned at each end of transfer line 6. These valves are normally closed, but are open during a transfer operation. Pump 7 is employed to withdraw the oil from cargo vessel 2 through suction line 8 and to force it through line 6.

A compressed gas tank 12 of known internal volume is connected by means of line 10 to transfer line 6 at any point along the latter's length. Valve 11 in line 10 is used to control the flow of gas from tank 12 to line 6. Pressure indicator 9 and pressure indicator 13 are employed to determine the pressures existing within line 6 and tank 12 respectively. These indicators may be of any conventional type, but are preferably large dial pressure gauges with the smallest possible subdivisions consistent with the required pressure range. Accurate dial gauges having ½ pound subdivisions have been found to be entirely satisfactory for use on the transfer line, while gauges with 1 pound subdivisions are saitsfactory on the air tank.

Any gas such as air or nitrogen that is substantially non-soluble in oil and follows the ideal gas laws reasonably well at ambient temperatures may be supplied from any convenient pressure source to tank 12 through line 14 and valve 15. For the sake of illustration, it will be considered that air is the gas being used.

A valve 16 is preferably located at a high point of line 6 for the purpose of venting air or any other gas or vapor from the line.

The internal volume of tank 12 must be known and should preferably be not more than a few percent of the volume of line 6 between valves 4 and 5. It is preferred that the calibrated internal volume of tank 12 include the volume of line 14 between valve 15 and tank 12 and also the volume of line 10 between valve 11 and tank 12; but this precaution will not generally be necessary since the combined volumes of these line sections will usually be negligible in comparison with the volume of the tank. It is also preferred that valves 4 and 5 be positioned as near as possible to cargo vessel 2 and storage tank 3 respectively.

Before describing the working of the present invention it will be necessary to first define certain terms which will in turn be used to define the invention itself. These terms and their definitions are as follows:

$P_1$ = absolute pressure existing within tank 12 before any air is passed from tank 12 to line 6.

$P_2$ = absolute pressure existing within tank 12 after air has been passed from tank 12 to line 6.

$P_3$ = absolute pressure existing within line 6 before any air is passed from tank 12 to line 6.

$P_4$ = absolute pressure existing within line 6 after air has been passed from tank 12 to line 6.

$\Delta P_T = P_1 - P_2$.

$\Delta P_L = P_4 - P_3$.

$V_T$ = volume of air tank 12.

$V_1$ = volume of void space (air) in line 6 before an oil transfer. In the example this will be the volume of air in line 6.

$V_2$ = volume of void space (air) in line 6 after an oil transfer.

$V_3$ = volume of oil transferred into storage tank 3 or any other destination, as determined at the destination. In the example, this will be the volume determined by gauging tank 3.

$V$ = volume of oil actually transferred from vessel 2 or other source into tank 3 and line 6.

Any consistent units may be used for the volumes and pressures listed above. It is generally convenient to express volumes in gallons and pressures in pounds per square inch.

For facilitating working of the invention, it is generally preferred (1) that $P_1$ be of a value such that $P_2$ will be equal to or greater than $P_4$, and (2) that $\Delta P_L$ will be positive in value and sufficient in magnitude to be determined accurately by pressure indicator 9. $\Delta P_L$ should also be great enough to overcome the head of liquid in any traps occurring in the transfer line. Variations in the working of the invention will become apparent as the description of the invention progresses.

Referring again to the accompanying drawing, it will be assumed that a substantially non-volatile and non-compressible oil is about to be transferred from vessel 2 to storage tank 3. Valves 4 and 5 are shut, and the amounts of oil contained in vessel 2 and tank 3 are determined by gauging or any other conventional procedure. Tank 12 is filled with air from a convenient source through valve 15 and line 14 to pressure $P_1$.

It will also be assumed that transfer line 6 between valves 4 and 5 is partially filled with oil and contains a volume of air equal to $V_1$ under pressure $P_3$.

With valve 15 in the closed position, air from tank 12 is admitted into line 6 by opening valve 11. As a result, the pressure within tank 12 decreases while the pressure within line 6 increases until pressure values of $P_2$ and $P_4$ are reached in tank 12 and line 6 respectively. Valve 11 is then shut.

It is apparent that a pressure drop $\Delta P_T$ has taken place in tank 12 and a pressure increase $\Delta P_L$ has occurred in line 6. Knowing these pressure change values as well as the volume $V_T$ of tank 12, it is then possible to calculate the volume of void space (air space) in line 6 by the following equation:

$$V_1 = \frac{(V_T)(\Delta P_T)}{(\Delta P_L)}$$

Valves 4 and 5 are then opened and oil transferred from vessel 2 to tank 3 through lines 8 and 6 by means of pump 7. Upon completion of the transfer, valves 4 and 5 are again shut and pump 7 shut down.

Vessel 2 and storage tank 3 are again gauged to ascertain the volume of oil transferred from the vessel to the storage tank. It is apparent that the measurements made at vessel 2 will substantially check those made at tank 3 providing the volume of void or air space in line 6 has remained the same. The volume of oil $V_3$ transferred into tank 3, however, will not check the volume transferred from vessel 2 if the volume of void or air space in line 6 has changed materially. It is obvious that such a condition can precipitate considerable disagreement as to the correctness of the measurements made on the vessel and at the storage tank unless the discrepancy occasioned by the air volume change in line 6 can be cleared up.

This discrepancy can be resolved by repeating the procedure described earlier of pressuring line 6 with air from tank 12 and determining the new volume of air in line 6. It will be assumed that the second air pressuring operation reveals that line 6 contains a new volume of air $V_2$. With this new value it is now possible to correct the volume of oil $V_3$ actually transferred into tank 3 so as to include the net volume of oil gained or lost by transfer line 6 by the following algebraic expression:

$$V = V_3 - (V_2 - V_1)$$

In accordance with the above equation, the volume of oil ($V$) transferred from vessel 2 is equal to the sum of the volume of oil ($V_3$) received by the receiving tank 3 plus or minus the volume of air lost or gained respectively in the transfer line during the transfer. In other words, when the volume of air in the transfer line increases during a transfer operation, less oil has been transferred from the source to the line than has been transferred from the line to the destination. In this instance, the total volume of oil transferred must necessarily be equal to the volume of oil removed from the line less the net volume of oil lost by the line. The reverse situation is true when the volume of oil transferred from the line to the destination is less than the amount of oil transferred from the source to the transfer line. In this instance, a volume of oil reaching the destination must be increased by the net amount of oil gained by the transfer line.

The corrected volume $V$ will check the volume of oil transferred from vessel 2 (as determined directly on the vessel) providing, of course, that no mishandling of the oil during the transfer operation has taken place. If mishandling of the oil has actually taken place so that a loss has occurred, the use of the present procedure will greatly assist in determining the amount and source of the loss.

While the method just described is best applied to measuring transfers of substantially non-volatile and non-compressible liquids, it can also be applied to volatile and/or compressible liquids by applying correcting factors such as are well known in the art.

The method of the present invention has been employed in transfer operations involving petroleum products such as gasoline and has determined air volume changes in transfer lines with an accuracy of greater than 98 per cent. This high degree of accuracy is well within the required limits.

It will be noted that a single air tank 12 can be employed in conjunction with a plurality of transfer lines by suitable manifolding.

While a calibrated tank is a preferred apparatus for introducing known volumes of a gas into a liquid transfer line for the purposes of the present invention, other forms of apparatus conventionally employed for metering gases may be used. For example, devices such as wet test meters, orifices, rotameters, etc. could be readily adapted and employed.

It will be noted that the terms "conduit" and "line" as used in the specification are intended to include all forms of rigid or flexible pipes, tubes, tubing, etc. that retain a substantially constant cross-sectional area throughout their length at the pressures employed for any given liquid transfer operation. Suitable conduit materials include steel, copper, brass, rubber, plastics and the like.

It is contemplated that the gas or void spaces in any given transfer line will be at substantially the same temperature as the gas in the calibrated tank that is used in conjunction with the transfer line. If a temperature difference does exist, suitable corrections can be applied to the ideal gas law calculations involved to compensate for the difference. Such corrections are well known in the art, and it is not felt necessary to discuss them here. Needless to say, the use of such corrections will depend upon the degree of accuracy required in any given case.

The term "substantially non-volatile" liquid as used herein is intended to designate those liquids which have vapor pressures of less than 500 mm. at 100° F. This term therefore includes mixtures of hydrocarbons that boil within the gasoline boiling range or higher.

What is claimed is:

1. A method for determining the volume of a liquid that is transferred from a supply source to a receptacle and a conduit connecting said source with said receptacle, wherein said conduit contains varying volumes of gas and said liquid, which comprises closing each end of said conduit which contains a first volume of gas under a first pressure, filling a container of known volume to a second pressure with a gas that is substantially insoluble in said liquid, passing at least a portion of the gas in the container from the container into the closed conduit, whereby a first pressure drop occurs within said container and a first pressure rise occurs within said closed conduit, measuring said first pressure drop and said first pressure rise, determining said first volume of gas from the relationship $$V_1 = V_T \left( \frac{\Delta P_{T_1}}{\Delta P_{L_1}} \right)$$

in which $V_1$ is said first volume of gas, $V_T$ is the volume of said container, $\Delta P_{T_1}$ is said first pressure drop and $\Delta P_{L_1}$ is said first pressure rise, opening each end of said closed conduit, transferring said liquid from said supply source into said conduit and said receptacle, again closing each end of said conduit which contains a second volume of gas under a third pressure, determining the volume of liquid transferred into said receptacle in a conventional manner, again filling said container of known volume to a fourth pressure with a gas that is substantially insoluble in said liquid, again passing at least a portion of the gas in said container from the container into the closed conduit whereby a second pressure drop occurs within said container and a second pressure rise occurs within said closed conduit, measuring said second pressure drop and said second pressure rise, determining said second volume of gas from the relationship:

$$V_2 = V_T \left( \frac{\Delta P_{T_2}}{\Delta P_{L_2}} \right)$$

in which $V_2$ is said second volume of gas, $V_T$ is the volume of said container, $\Delta P_{T_2}$ is said second pressure drop and $\Delta P_{L_2}$ is said second pressure rise, and determining the volume of liquid transferred into said conduit and said receptacle from said supply source by the relationship $V = V_3 + V_1 - V_2$, in which V is the volume of liquid transferred into said conduit and said receptacle and $V_3$ is the volume of liquid transferred into said receptacle.

2. Method as defined in claim 1 in which the liquid is petroleum oil and the gas in the container is air.

References Cited in the file of this patent

UNITED STATES PATENTS

| Number | Name | Date |
|---|---|---|
| 1,508,969 | Guichard | Sept. 16, 1924 |
| 1,885,926 | Lewis | Nov. 1, 1932 |
| 2,113,686 | Gift | Apr. 12, 1938 |
| 2,314,540 | Huntington | Mar. 23, 1943 |